Oct. 25, 1949.  W. H. T. HOLDEN  2,485,883
AIR POSITION INDICATOR
Filed June 2, 1944  4 Sheets-Sheet 1
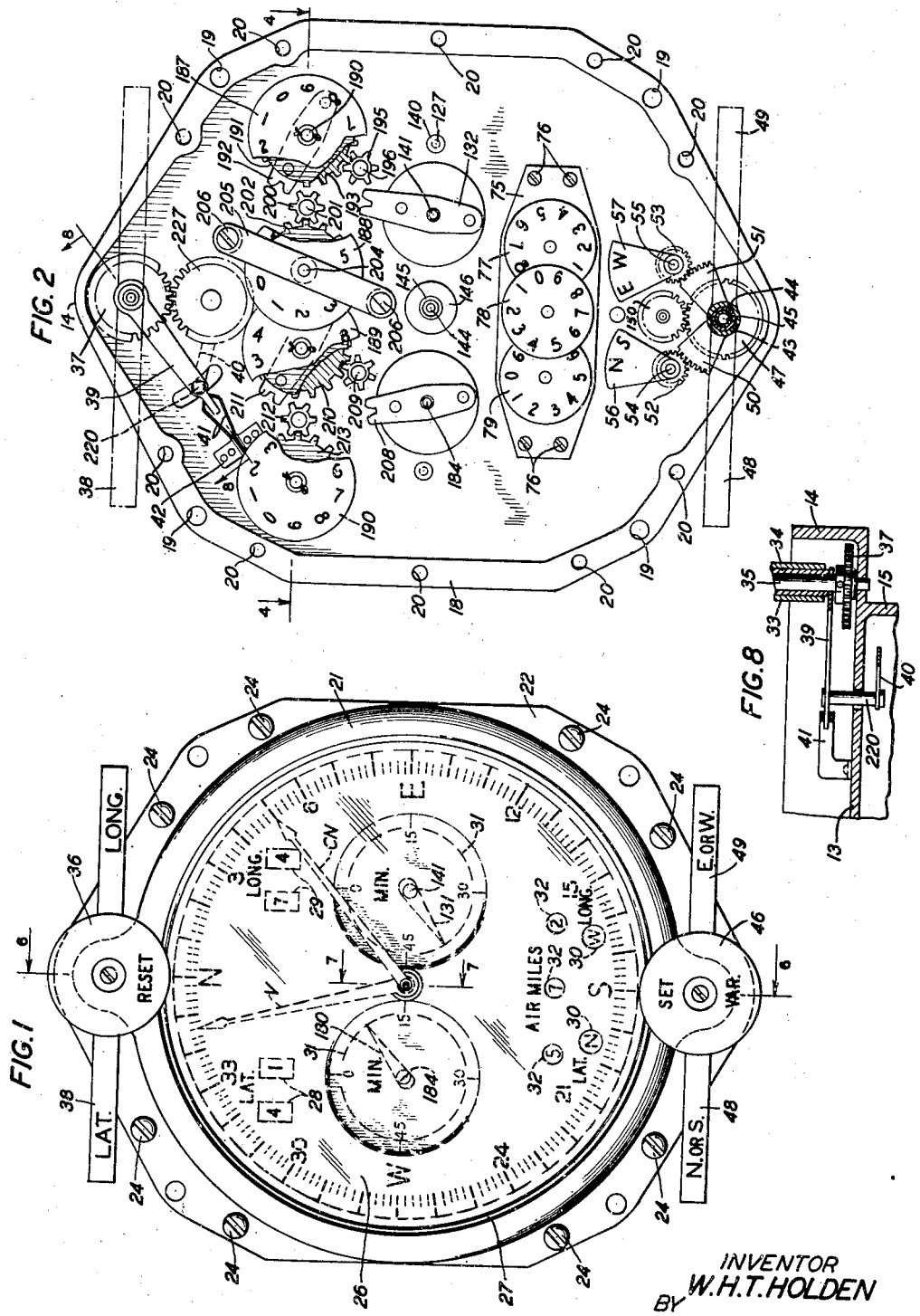
INVENTOR
W.H.T. HOLDEN
BY
A. F. Kane
ATTORNEY

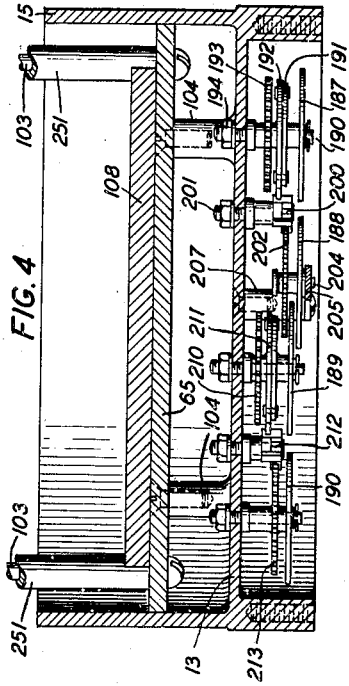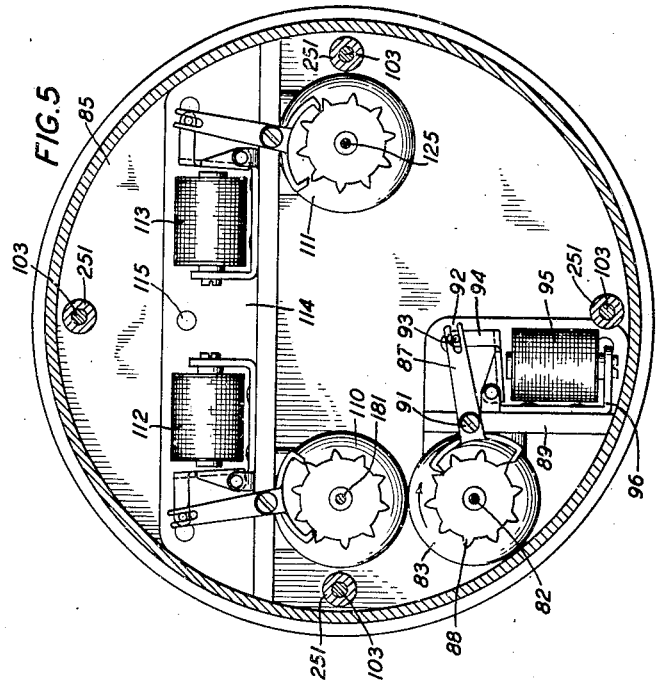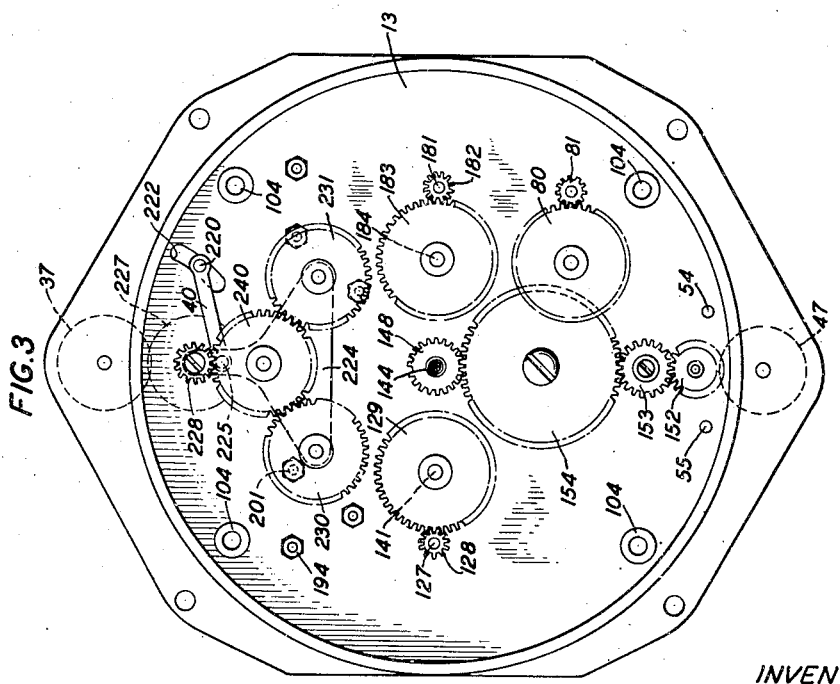

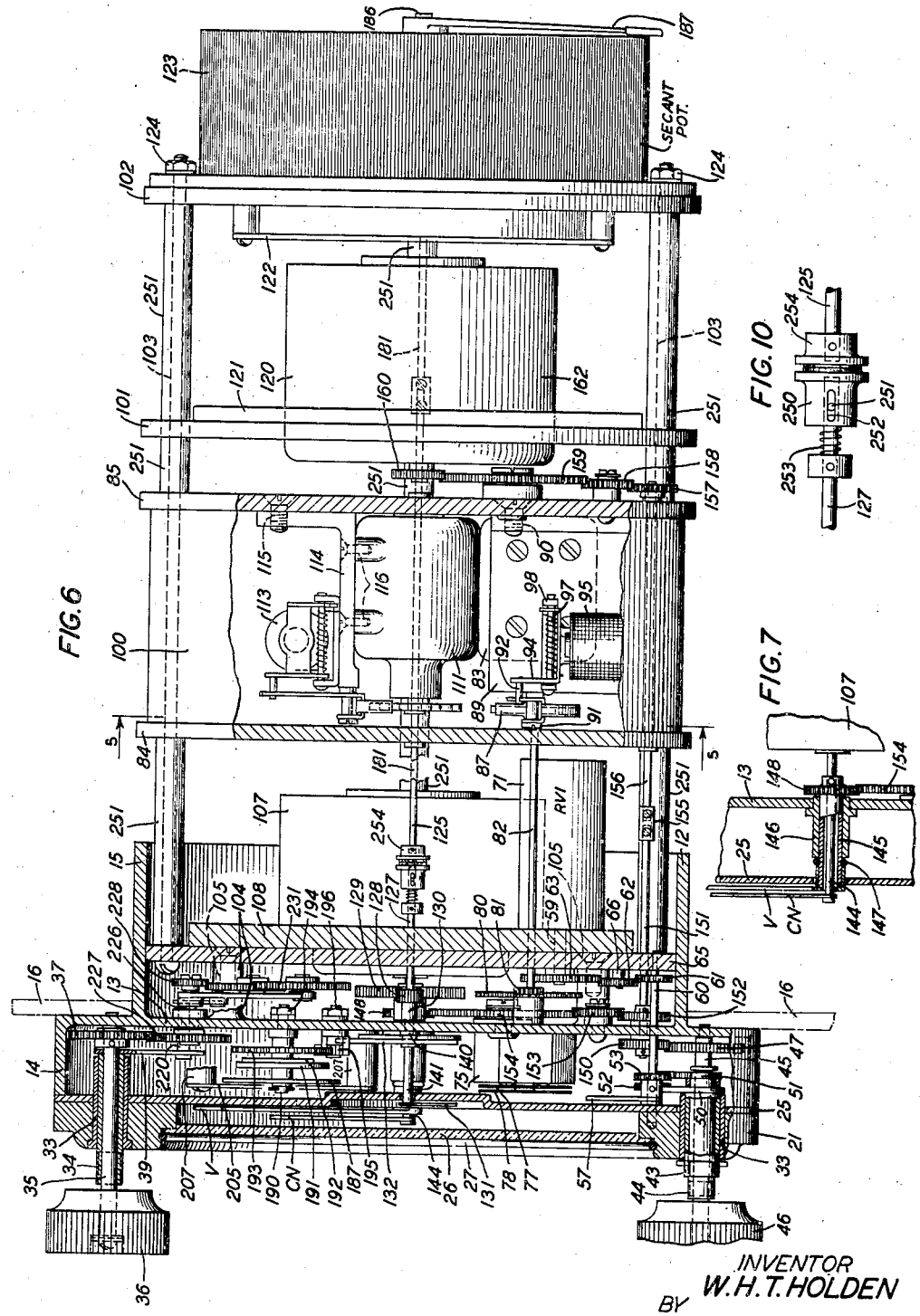

Oct. 25, 1949.
W. H. T. HOLDEN
2,485,883
AIR POSITION INDICATOR
Filed June 2, 1944
4 Sheets-Sheet 4
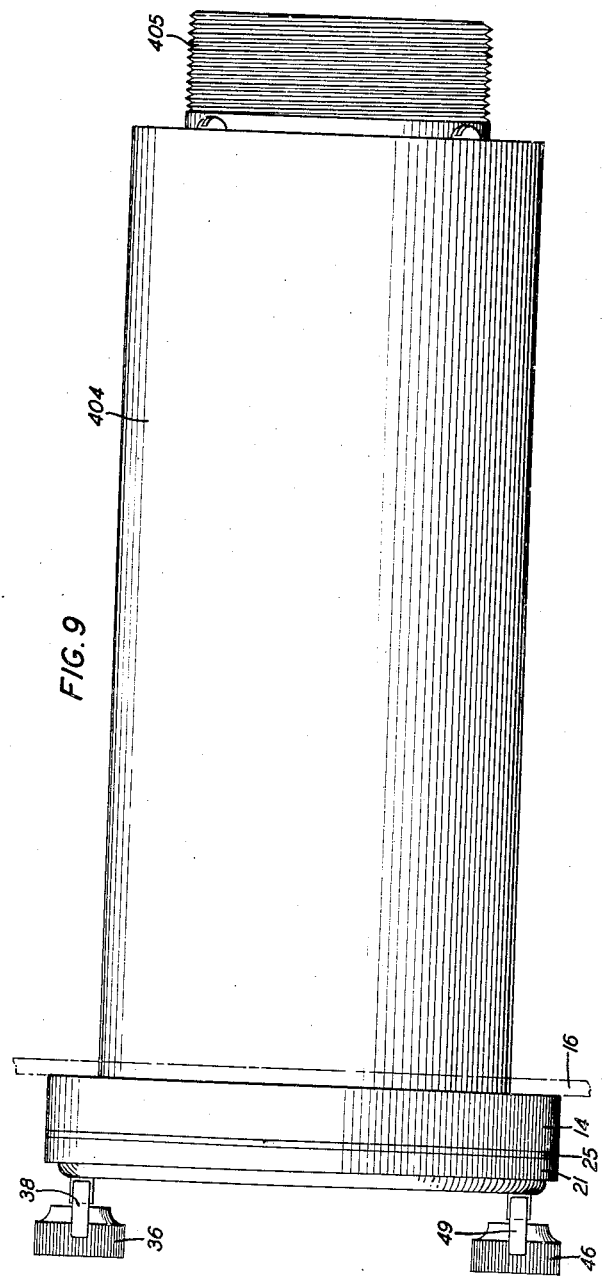
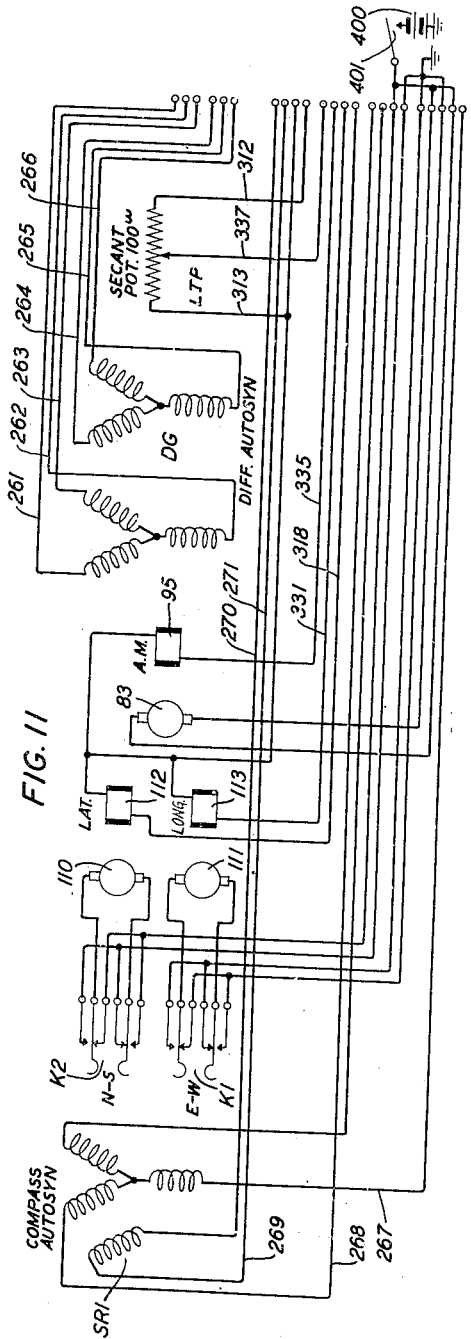
INVENTOR
W.H.T. HOLDEN
BY
A. F. Kane
ATTORNEY Patented Oct. 25, 1949

2,485,883

UNITED STATES PATENT OFFICE 2,485,883

AIR POSITION INDICATOR

William H. T. Holden, Woodside, N. Y., assignor to Bell Telephone Laboratories, Incorporated, New York, N. Y., a corporation of New York Application June 2, 1944, Serial No. 538,529

6 Claims. (Cl. 235—1)

This invention relates to panel mounted instruments for aircraft and particularly to an air position indicator for enabling the pilot or navigator of an aircraft to determine, at any instant during a flight, the latitude and longitude of his position and the number of miles the aircraft has traversed from any specified take-off point.

It is the object of this invention to provide an air position indicator which is so structurally designed as to concentrate in a relatively small area and within constant view of the pilot or navigator, all the component elements of the indicator which serve to appraise the observer of the number of air miles traversed on a flight from a specified take-off point, the latitude and longitude position of the aircraft at any particular instance, the true compass heading, and other pertinent information relating to the course and position of the aircraft, and to otherwise improve such indicators as to their structural and assembly aspects.

In my United States Patent 2,434,270, issued January 13, 1948, there is disclosed a system of electrical controls for an indicator of the general type defined above. The indicator schematically disclosed in Fig. 3 of the drawings of that patent comprises essentially latitude and longitude counters, an air miles register, individual stepping controls for said counters and register, a true compass course indicator, a manually operable variation correction device comprising a differential generator autosyn for introducing variation corrections, a secant or latitude transmitter potentiometer, hemisphere selection switches, and manually operable controls for resetting the latitude and longitude counters and for operating the hemisphere selection switches.

The system disclosed in the aforenoted patent, and as described therein, operates on signals provided by an air mileage unit and a fluxgate, or magnesyn remote indicating compass. The air mileage unit delivers, in a well-known manner, a rate of rotation proportional to true air speed. The air speed shaft of this unit drives a direct current generator which functions to convert the air speed into a voltage and also to resolve this voltage into components $E_o \sin C_N$ and $E_o \cos C_N$, where $E_o$ is the voltage proportional to true air speed and $C_N$ is the true compass heading as determined by the fluxgate or magnesyn. These voltages are integrated to determine the change in latitude and longitude through the medium of a motor generator set for each component. In this manner each of the latitude and longitude indicators, or counters, through the media of impulse responsive stepping devices, is controlled from its own motor generator set, which sets, in turn, respond to the signals provided by the air mileage unit and the fluxgate or magnesyn in a manner fully described in the said patent. The air mileage counter is controlled directly from the air miles motor unit by means of a stepping mechanism.

The indicator of this invention responds to the same controls effected by the system of the above-identified patent and embodies structural and assembly features which adapt it for convenient mounting in a standard aperture located in the instrument panel of a modern aircraft. More particularly, the basic mounting structure for the component elements of the air position indicator comprises a casting which is divided into two separate compartments by an intervening wall or partition, one of said compartments being peripherally defined by an inwardly projecting circular rim having an external diameter substantially that of a standard instrument panel aperture whereby the rim may be inserted in the aperture so as to mount the indicator on the panel. The other compartment is peripherally defined by an outwardly projecting irregular decagonal rim having a diameter in excess of that of the inwardly projecting rim so as to effect a substantially annular shoulder which abuts the front face of the instrument panel and provides means whereby the casting may be removably fixed to the panel.

In accordance with a particular feature of the invention all the elements of the indicator which function to register and display the information pertaining to the bearing of the aircraft, the mileage covered thereby, the true course of flight, and the particular hemispheres in which a flight is being conducted are mounted on one side of the casing wall so as to occupy, as a unitary counter assembly, the forward compartment effected by the forwardly projecting casing rim. Mounted on the other side of the casing wall and confined within the compartment effected by the rearwardly projecting rim are those elements, such as gears, which are required to transmit the information from the controlling elements of the indicator to the register and display elements.

Another feature of the invention resides in assembling the main control elements, such as stepping mechanisms, hemisphere reversing switches, the synchro-receiver and generator and the secant potentiometer as a unit, separate and distinct from the counter assembly, and adapting it for support on the casing wall so as to project rearwardly therefrom. An auxiliary or related feature contemplates a supporting structure for the said unitary assembly which permits the tandem mounting of the larger elements of the unit as separately removable subunits.

A further feature of the invention resides in the means manually operable from the front of the indicator for operating the hemisphere reversing switches located to the rear of the casing wall. More particularly, this feature contemplates a plurality of concentric shafts or sleeves which project through a single aperture located in the casing cover to terminate at their outer ends in individually operable levers, and at their inner ends in individual geared sectors each of which controls a display unit indicative of the hemisphere in which the flight is being conducted and, through an individual gear train, a corresponding reversing switch. This concentric arrangement of the lever-controlled sleeves renders it possible for utilizing a single aperture in the casing cover for the accommodation, not only of the said sleeves but also of a centrally disposed shaft which supports at its outer end a knob which is manually operable to actuate other independent gear trains which simultaneously control the setting of the variation correction pointer and of the differential generator.

A still further feature of the invention resides in a similar concentric arrangement of a lever-controlled sleeve and a knob-controlled shaft which are cooperatively operable to select and operate either of the latitude and longitude counters so as to reset them. More particularly, the knob-controlled shaft is utilized as a common medium for resetting both the latitude and longitude counters, and the lever-controlled sleeve, depending upon its direction of rotation, serves as a selecting medium whereby a preselected counter is operated upon the actuation of the knob-controlled shaft.

These and other features of the invention, not specifically identified, will appear from the following detailed description made with reference to the accompanying drawings, in which:

Fig. 1 is a front view of the indicator showing the compact and orderly arrangement of the various indicating and registering elements as viewed by a pilot or navigator, and also the relative locations of the knobs and levers which are accessible to the pilot or navigator for manual operation;

Fig. 2 is a view of the indicator corresponding to Fig. 1 and with the dial cover and dial card of the latter removed to expose the counter equipment supported on the front face of the casing wall;

Fig. 3 is a rear view of the structure shown in Fig. 2 and illustrates, particularly, those elements through which the counter assembly elements of Fig. 2 are controlled from the impulse responsive devices located to the rear of the indicator unit. This figure also shows those elements which respond to the manually operable levers and knobs mounted on the face of the indicator;

Fig. 4 is a section taken along the line 4—4 of Fig. 2, looking in the direction of the arrows and shows, particularly, the interrelation of the various gears, Geneva pinions, etc., of the latitude and longitude counters;

Fig. 5 is a view taken along the line 5—5 of Fig. 6 and illustrates the various stepping units which control the air miles register and the latitude and longitude counters;

Fig. 6 is a longitudinal view of the air position indicator and constitutes a section taken along the line 6—6 of Fig. 1, looking in the direction of the arrows;

Fig. 7 is a fragmentary view taken along the line 7—7 of Fig. 1, looking in the direction of the arrows and illustrates the manner in which the true course and variation correction pointers of the true course compass are mounted so as to respond to independent controls;

Fig. 8 is a section taken along the line 8—8 of Fig. 2 and illustrates the link mechanism which is controlled from the front of the indicator for the purpose of selecting the latitude and longitude counters for resetting;

Fig. 9 is an over-all view of the indicator encased in a cover to which is fixed one element of a suitable connector which facilitates the electrical connection of the indicator to its remotely located controls;

Fig. 10 is an enlarged view of the friction clutch employed to couple the sections of the longitude and latitude counter drive shafts; and Fig. 11 is a schematic wiring diagram showing the various elements of which the indicator is made up and the electrical connections involving the same.

The following description is made with particular reference to the structural views shown in Figs. 1 to 10, inclusive.

At 12, Fig. 6, is shown a casting of magnesium or other suitable material which forms a part of the front of the indicator. This casting comprises two open-mouthed cylindrical compartments separated by a common wall or partition. One of the compartments is defined by the common intervening wall 13 and a forwardly projecting rim 14, or flange, while the other compartment is defined by the common intervening wall 13 and the rearwardly projecting rim 15. The latter compartment is of smaller internal diameter than the former compartment and is so dimensioned as to be capable of fitting snugly in a standard aperture of the instrument panel indicated at 16. The rear face of the portion of the casing, which projects beyond the rim 15 and connects with the rim 14, abuts the forward face of the panel 16 when the indicator is positioned on the panel.

The casing wall 13 constitutes a support for the counter assembly, all the elements thereof being fixed thereto in a manner to be described presently.

The outer peripheral contour of the casing rim 14 is substantially decagonal as shown in Fig. 2, for example, and is provided with a flange 18 which accommodates a plurality of holes which are identified by the numerals 19 and 20. A front cover 21 is generally circular but is provided with a flange 22 which is of the same contour as that of the flange 18 of the casing. This flange is provided with two sets of holes which, when the front cover 21 is positioned on the casing 14, align with the corresponding holes 19 and 20 of the casing flange 18. The aligned holes 20 in the flanges 18 and 22 receive screws 24 by means of which the cover 21 may be removably secured to the casing 12, the flanges 22 and 18 abutting each other in mutual alignment. The holes 19 in casing flange 18 and their corresponding holes in the cover flange 22 accommodate screws (not shown) which are of sufficient length to pass through correspondingly located holes in the panel 16 and by means of which the casing 12 and cover 21 are secured to the panel 16.

A dial or compass card 25 having the same general contour as the cover flange 22 and the casing flange 18 is interposed between the said cover and casing flanges and is clamped therebetween by means of the screws 24, it being understood that the dial is provided with suitably located holes to accommodate such screws.

The cover 21 is provided with a centrally located circular depression or recess which accommodates a window 26 of glass or other suitable transparent material. A wire clamp ring 27 is provided for holding the window 26 in position, there being a circular groove in the inner edge of the recessed cover portion which accommodates the wire ring 27 when snapped into position.

The compass card 25, as clearly shown in Fig. 1, is provided with a circular compass rose having four diagonally disposed points designated N, S, E, and W, respectively. The compass rose is divided into thirty-six large divisions which are each subdivided into five smaller divisions. The upper portion of the compass card 25 is provided with two sets of two horizontally aligned windows 28 and 29. Over the first set of windows 28 appears the designation Lat. and over the other set of windows 29 appears the designation Long. The center portion of the compass card 25 is provided with two 60-minute indicating dials 31 each of which bears the designation Min. and on each of which the zero, fifteen, thirty and forty-five minute points are designated by the appropriate numerals. Near the lower central edge of the compass card 25 are located two circular windows 30 on either side of the designation S on the card. Above the windows 30 are located on the card 25 three circular windows 32. The right and left windows 30 are respectively identified by the designations Lat. and Long. The purpose of the various windows and dials on the compass card 25 will appear as the description of the indicator progresses.

The cover 21, at diagonally disposed upper and lower points, is apertured to accommodate the bushings 33, Fig. 6, which are firmly seated in their respective apertures. In the upper bushing 33 there is rotatably housed a sleeve 34 through which a shaft 35 projects, its outer end having secured thereto a manually rotatable knob 36 and its inner end having secured thereto a gear wheel 37. The sleeve 34, at its outer end, is integrally associated with a two-armed horizontal lever 38, Fig. 1, which bears, on opposite sides thereof, the designations Lat. and Long., respectively. The knob 36 bears the designation Reset. The inner end of the sleeve 34 is associated with a set of links one of which is shown at 39 in Fig. 2 and the other is indicated by the broken line 40. The link 40 is shown in full line in Fig. 3. The function of the reset knob 36 and the lever 38 will be set forth in greater detail hereinafter. It may be well at this time to point out that the link 39 is fixedly associated with the inner end of sleeve 34, to the outer end of which the lever 38 is fixed so that the link 39 responds to any tilting movement of the lever 38 through the sleeve 34, and that the shaft 35 is rotatable by the knob 36 independently of the sleeve 34. Also, that the link 39, and therefore the lever 38, is spring biased so that the lever 38 is normally maintained in the horizontal position illustrated. The outer end of the link 39 is confined between two flat biasing springs 41 which in turn are mounted on the casing wall 13 by means of the brackets 42 as clearly shown in Fig. 2.

The bushing 33 located at the bottom of the dial cover 21 accommodates three concentrically disposed elements, a sleeve 43 of relatively large diameter, a sleeve 44 of lesser diameter and the shaft 45 of still smaller diameter. The outer end of shaft 45 carries a manually operable knob 46 which bears the designation Set var. At the innermost end of shaft 45 is fixed a gear wheel 47, the purpose of which will be described hereinafter. Fixed to the outer end of sleeve 43 is a horizontal lever 48 while a similar lever 49 is fixed to the outer end of sleeve 44, it being understood that the sleeves 43 and 44 are independently rotatable by their corresponding levers 48 and 49. The inner end of sleeve 43 has fixed thereto a geared sector 50, whereas a similar geared sector 51 is rigidly associated with the inner end of sleeve 44. The teeth of the geared sectors 50 and 51 mesh respectively, with the pinion gears 52 and 53, Fig. 2, which are carried by the shafts 54 and 55, respectively. Fixed respectively, to the shafts 54 and 55 are the indicator elements 56 and 57 bearing the designations NS and EW, respectively, which elements are disposed immediately behind the windows 30 of the dial card 25, so that, depending upon which of two positions each of the indicator elements occupies, the designation N or S will be displayed through the left window 30 and the designation E or W will be displayed at the right window 30. The shafts 54 and 55 may be characterized as "reverser switch" shafts since, through them, the reverser switches such as RV1, shown schematically in Fig. 11 as K1 and K2, respectively, are operated incident to the operation of the levers 48 and 49. One of these reverser switches is indicated at RV1 in Fig. 6. The other switch is located in back of the switch RV1 and does not appear in Fig. 6. However, both switches may be mounted in any suitable manner on the casting 108 and enclosed by a single cover or by separate covers such as is indicated by the designation 71. The casting 108, which will be described in greater detail hereinafter, may be secured to the plate 65 of the mounting frame in any suitable manner.

The switch RV1, as shown in Fig. 6, is operated directly by shaft 59 which, at its inner end, is provided with a suitable contact spring operating device effective, when the shaft is rotated, to actuate the spring pile-up K1 shown in Fig. 11. The shaft 59 at its outer end has fixed thereto a gear 63 which meshes with pinion gear 62 mounted on a stub shaft 66 fixed to plate 65, which in turn meshes with gear 61 carried on the inner end of shaft 55. The shaft 55 rotates in bearings provided by the dial cover 21, the casing wall 13 and the plate 65 and, at its outer end, carries gear 53. As previously indicated, the gear 53 is rotated under the control of geared sector 51 which, in turn, is fixedly associated with the inner sleeve 44 rigidly associated with the lever 49. Obviously, when the lever 49 is tilted clockwise, viewing Figs. 1 and 2, the shaft 53 is rotated to alter the meridian direction display carried by the indicator element 57.

It is to be understood that the second reversing switch not shown in Fig. 6 but indicated at K2 in Fig. 11 is controlled through a similar gearing arrangement which responds to the actuation of lever 48, the latter also causing the indicator element 56 to display a different hemisphere designation. The indicator elements 56 and 57 normally display the designations N and W, respectively, which are viewed through the left and right dial card windows 30, respectively.

Located in back of the dial card 25 and immediately behind the circular windows 32 thereof, is an air mileage counter 75 which is mounted on the casing wall by means of four screws 76 as shown in Fig. 2, two of which appear in Fig. 6. This mileage counter comprises three numeral bearing discs 77, 78 and 79 each carried by its own independent shaft as shown in Fig. 2. This counter may be of any well-known type in which the three counting discs register miles traversed in one-mile, ten-mile and hundred-mile units, respectively, and are so intercoupled that the latter two are driven at proportionately slower speeds than the first disc which in turn is driven by means of a rotatable shaft 82. In the present disclosure the drive shaft for the mileage counter 75 is illustrated as terminating in a gear 80 which meshes with a gear 81 fixed to the forward end of the shaft 82 which is driven through an electromagnetically controlled escapement mechanism and a stepping motor for the mileage counter 75 is shown schematically at 83 and is one of the elements of a stepping motor unit 100 mounted between the frame plates 84 and 85. The winding of the motor 83, which motor is of the reversible type, is normally energized so that its normal tendency is to rotate in one or the other direction depending upon the direction of current in its winding. However, in the stepping motor 83 which controls the mileage counter 75 there is no necessity for resorting to both directions of rotation since the counter will always be operated in the same direction to progressively increase the reading of the counter dials 77, 78 and 79 as the flight of the aircraft from a predetermined take-off point continues. However, some means for reversing the direction of the rotation of the motor 83 may be furnished in the event it is desirable, at the start of a flight, to reset the mileage counter so that the mileage reading would be zero. The mileage counter may also be designed to be reset by hand if desirable.

As shown in Fig. 5, the motor 83 normally is energized to cause rotation in a clockwise direction. The rotation of the motor is prevented, however, by the engagement of one of the pronged ends of the escapement pawl 87 with a tooth of the escapement wheel 88. The wheel 88 is fixed to the motor shaft which, in reality, is an extension of the drive shaft 82. The escapement pawl 87 is pivotally mounted on the edge of a mounting bracket 89 at 91, which bracket is secured to the plate 85 by means of screws, such as 90, only one of which appears in Fig. 6. The bracket 89 also supports the motor 83 which is fixed to the bracket by the screws indicated. The outer end of the escapement pawl 87 is bifurcated, or forked so as to present a slot 92 which receives a pin 93 fixed to the vertical extension of the magnet armature 94. The operating coil 95 of the magnet, together with its armature 94 are carried on a bracket 96 which is fixed to the bracket 89 by means of screws. A coil spring 97 wound around a pin 98 serves to normally bias the armature 94 to the position illustrated in Fig. 5 and to return the armature to this position upon deenergization of the coil 95. The coil 95 receives, and responds to impulses transmitted from the control equipment as described in the above-identified patent and as will be described briefly hereinafter. As the coil is intermittently energized by the received impulses the armature 94 is correspondingly operated to cause the operation of the escapement pawl 87. For each impulse received by the coil 95 and for each consequent operation of the escapement pawl 87, the toothed wheel 88 is allowed to advance one step in a clockwise direction. The shaft 82 experiences a similar movement and causes the mileage counter 77 to advance correspondingly. The continued energization of the coil 95 by the impulses received during a flight causes the mileage counter to register the mileage traversed by the aircraft during the flight. As the counter discs 77, 78 and 79 are advanced, they display various numerals at the windows 32 of the dial card 25 so that the pilot or navigator may readily observe and calculate the distance traversed by the aircraft.

Before continuing with the description of the counter assembly shown at the left of Fig. 6, it may be well at this time to describe the structure employed to support the various elements which control the operation of the counter assembly apparatus. This mounting structure consists essentially of the plate 65, the stepping motor unit 100 located between the plates 84 and 85 and two other plates 101 and 102, all plates being of the same general configuration, substantially circular. Each such plate is provided with four diametrically disposed holes through which four screw rods 103 pass. The screw rods 103 support spacing sleeves 251 which serve to accurately position the various operating elements of the indicator on the rods and to prevent displacement thereof. This structure may be assembled as a unit separate and distinct from the counter assembly and slid into the cavity provided by the circular rim 15 of the casing 12. To limit the extent to which this unit may be projected into the cavity the casing wall 13 is furnished with four bosses 104, two of which appear in Fig. 6 and all four of which are indicated on Fig. 3. These bosses serve to space the inner end plate 65 from the casing wall 13 and are threaded to receive the screws 105 by means of which the structural unit is secured to the casing 12.

The plate 65 is provided with a centrally located circular opening, or aperture having a diameter such as to permit the projecting end of a synchroreceiver unit to pass therethrough. The synchroreceiver is referred to and described in detail in the aforenoted patent and, as illustrated in Fig. 6, is housed in a casting 107 having a circular flange 108 which abuts the inner face of plate 65 when the receiver is placed in position. Screws may be employed to secure the casting 107 to the plate 65.

The plates 84 and 85, as hereinbefore mentioned, define the outer limits of the stepping motor unit 100. Besides the stepping control mechanism for the mileage drive shaft 82 previously described, this unit 100 also embodies two other stepping motors which are identical, structurally and in operation, to the mileage counter control unit hereinbefore described. For purposes of identification, the stepping motors of these units are designated by the numerals 110 and 111 and their associated stepping magnets are designated by the numerals 112 and 113. To support these elements, a bracket 114 is fixed to the plate 85 by three screws 115, one of which is shown in Fig. 6. Each of the motors 110 and 111 is fixed to the underside of the bracket by screws 116, whereas the magnets 112 and 113 are fixed to the opposite side of the bracket by suitable screws.

The plate 101, spaced from plate 85, accommodates a casting 120 which is similar in design to the casting 107 and carries the differential generator. The casting flange 121 may be secured to the plate 101 in the same manner as is flange 108 secured to the plate 85.

The plate 102 is spaced from the plate 101 and, on its inner face, supports a gear reduction mechanism indicated by the numeral 122. On its outer face is mounted a secant potentiometer 123 which is secured in place by means of four nuts 124 which are screwed into the threaded ends of the rods 103.

The stepping magnet 113 receives impulses from the control circuit in a manner described in the above-identified patent and, through the motor 111 and the corresponding escapement mechanism, drives the shaft 125. In this connection it will be noted that the direction of current to the motor 111 may be reversed by the actuation of the reversing switch K2 (Fig. 11) and that, therefore, the shaft 125 is rotatable in either direction under control of the magnet 113. A friction coupling connects shaft 125 to shaft 127, which two shafts pass through suitable apertures in the plates 84 and 85. Near one end of shaft 127 is fixed a collar 255. The end of the shaft 127 carries the friction clutch member 250, which by virtue of the pin 251 and slot 252 is permitted a limited longitudinal movement relative to the shaft. A coil spring 253 interposed between the collar 255 and the clutch member 250 biases the member 250 towards the end of shaft 127 and thereby insures a firm engagement by the friction surfaces of the clutch members 250 and 254, the latter being fixed to the end of shaft 125 as shown in Fig. 10. Near the outer end of shaft 127 there is fixed a pinion gear 128 which meshes with the gear 129. The shaft 127 is provided with a sleeve 130 which serves to space the gear 128 from the casing wall 13. The end of shaft 127 operates in a bushing type bearing 140 identified in Fig. 2. As the shaft 127 responds to the operation of motor 111 through shaft 125 and the friction coupling, it drives the gear 129 which is mounted on the inner end of shaft 141 to whose outer end is fixed the longitude minutes hand 131. Thus, the hand or pointer 131, responsive to the operation of motor 111 sweeps over the dial 31 on the dial card 25, operating in either direction depending upon the direction of rotation of the shaft 127, which as illustrated, is frictionally coupled to the shaft 125 extending to the motor 111.

Just to the left of the longitude minutes dial 31 are illustrated two dial pointers designated CN and V. The manner in which these pointers are mounted is more clearly disclosed in Fig. 7. As shown, the shaft 144 extending from the synchro-receiver 107 has fixed to its outer end the pointer CN. A sleeve 145 whose inner diameter is slightly greater than the outer diameter of shaft 144 encloses the shaft 144. A bushing 146, fitted into a suitable aperture in the casing wall 13 encompasses the right-hand portion of the sleeve 145. The pointer V is provided with a right angular integral sleeve which is slipped over the outer end of sleeve 145 so as to be rigidly fixed thereto and rotatable therewith. A clamping ring 147 serves to preclude the possibility of the bushing 146 working towards the left on the sleeve 145 while its tendency to work to the right is precluded by the shoulder thereof which abuts the face of the casing wall 13. The sleeve 145 has fixed to its inner end a gear 148 which is controlled through a gear train, to be described presently, by means of the lower knob 46. From the foregoing description, directed particularly to Fig. 7, it is apparent that the dial pointer CN will experience any rotational movement imparted to the shaft 144 by the synchro-receiver 107, whereas the pointer V will experience any rotational movement imparted to the sleeve 145 by the gear 148.

As previously described, the shaft 45, to the outer end of which is fixed the knob 46, has fixed to its inner end a gear 47. The gear 47 meshes with the pinion 150 which is fixed to the outer end of shaft 151 which projects beyond the left side of the casing wall 13. Fixed to the same shaft 151 and located to the right of casing wall 13 is a pinion 152. Pinion 152 meshes with pinion 153 which is mounted on a stub shaft fixed to the casing wall 13. The gear 153, in turn, meshes with an idler gear 154 mounted, as illustrated, on the wall 13. The idler gear 154 meshes with the gear 148 which, as above indicated, is fixed to the sleeve 145 which mounts the pointer V. Through the train of gears just described, any rotational movement of the knob 46 is transmitted to the pointer V. The pointer CN being directly associated with the synchro-receiver shaft 144 is controlled by the said receiver.

The shaft 151, by means of the coupling 155, is connected to the shaft 156 which extends through suitable apertures in the plates 84 and 85 and mounts, on its innermost end, a gear 157. The gear train comprising gears 157, 158, 159 and 160 corresponds identically to the gear train comprising the gears 152, 153, 154 and 148 so that the differential generator 162, to the shaft of which is fixed the gear 160, is set in a manner corresponding to the setting of the variation pointer V incident to the manual rotation of the knob 46. The gears 158 and 159 are mounted on the plate 85 in substantially the same manner that the gears 153 and 154 are mounted on the casing wall 13.

It previously has been described how the longitude minutes pointer 131, carried on shaft 141, is controlled from the shaft 127 through the gears 128 and 129. A similar minutes hand 180 associated with the latitude minutes dial 31 is provided, and is controlled through a shaft 181 which, actually, is frictionally coupled to the shaft of stepping motor 110, which does not appear in Fig. 6 but which is shown in Fig. 5. The shaft 181 at its outer end carries the pinion 182 (Fig. 3), corresponding to pinion 128, which meshes with the gear 183, corresponding to gear 129, which pinion 182 and gear 183 are located directly in back of, and in alignment with, the corresponding elements 128 and 129, viewing Fig. 6. The gear 183 is mounted on the casing wall 13 in the same manner as gear 129 and, when rotated, causes a shaft 184 (Fig. 2) to rotate in a similar manner, it being understood that the shaft 184 carries the latitude minutes hand 180 as shown in Fig. 1. It will be understood that the shaft 181 extending from the motor 110 is extended through to the pinion 182 by way of a friction clutch similar to that shown in Fig. 10 and described hereinbefore.

The shaft 181 which carries the pinion 182 is driven under the control of stepping motor 110 and its associated control magnet 112 through the friction clutch in the same manner that shaft 125, carrying pinion 128, is driven by its corresponding stepping motor 111 and its associated control magnet 113. The shaft 181 extends rearwardly, as an extension of the shaft of motor 110, past the differential generator 120 and terminates at the input side of a gear reduction mechanism designated 122 in Fig. 6. The gear reduction mechanism comprises the usual complement of gears, the last in the train of which drives a shaft 186 to which the brush arm 187 of the secant potentiometer is fixed. The gear reduction mechanism provides a ratio of 600 to 1 in the relative speeds of rotation of the shaft 181 and the potentiometer shaft 186.

The so-called minutes shafts 141 and 184 of the longitude and latitude indicators function to drive the degrees register wheels of the said indicators by an interrupted gear and Geneva pinion. The longituded degrees register wheels are identified by the numerals 187 and 188 while the corresponding wheels of the latitude indicator are designated 189 and 190. It is deemed necessary to describe the operation of but one of these indicators since such description applies equally well to both. Considering, therefore, the longitude counter only, the units degrees register wheel 187 is carried fixedly on the stub shaft 190. A disc 191, mounted on the same shaft 190 in back of the wheel or dial 187, has riveted, or otherwise fixed thereto a Geneva pinion 192. Also mounted on the shaft 190 to the rear of the disc 191 and the Geneva pinion 192 is a gear 193. This entire assembly including the dial 187, disc 191, Geneva pinion 192 and the gear wheel 193 is carried by the stub shaft 190, which as clearly illustrated in Fig. 6, is rigidly mounted on the casing wall 13 and secured thereto by means of the nut 194. The gear 193 meshes with an interrupted gear 195 which is mounted on a stub shaft 196 secured to the casing wall 13 immediately below and slightly to the left of the stub shaft 190. This gear 195 comprises two integrally formed gears having six and three teeth, respectively, the tooth arrangement being such that every other one of the teeth is abbreviated so that three of the teeth are full length while the remaining three are shorter. Viewing Fig. 2, the six teeth section of the gear 195 is located in the rear so as to mesh with the teeth of the gear wheel 193, whereas the three teeth section is located at the front of the gear so as to be capable of engagement and operation by the Geneva pinion 132. Thus, as the longitude minutes shaft 141 responds to the control operations of the stepping motor 111 and rotates accordingly, in either direction, the shaft movements are imparted to the units degrees indicator 187 through the Geneva pinion 132, the interrupted gear 195 and the gear wheel 193 to which latter gear the units degrees indicator 187 is fixed.

For each complete revolution of the minutes hand, during which the hand or pointer 131 covers 60 minutes on the minutes dial 31, the Geneva pinion 132 engages with the interrupted gear 195 causing it to rotate counter-clockwise one-third of a revolution. During this one-third revolution of the gear 195, the gear 193 is advanced two teeth, or one-tenth of a revolution, there being twenty teeth on the gear 193. Obviously, therefore, the units degrees dial 187 is advanced one-tenth of a revolution, or the distance required to display the next succeeding numeral at the right-hand window 29 of the dial card 25. Thus, for every 60 minutes of longitude marked off by the minute hand 131 the units degrees dial 187 moves to indicate a change of one degree in longitude.

Interposed between the units degrees dial 187 and the tens degrees dial 188 there is an interrupted gear 200 mounted on a stub shaft 201 fixed to the casing wall 13. This element and the remaining component elements of the longitude and latitude indicators, or counters do not appear in Fig. 6, since to attempt to illustrate them in that figure would unnecessarily complicate the disclosure. These elements and their relative locations are, however, clearly indicated in Figs. 2 and 4. The gear 200 cooperates with the gear wheel 202 of the tens degrees longitude dial so as to advance it one position for every ten revolutions of the units degrees dial 187. The movement of the latter dial is transmitted to the tens degrees dial 188 through the Geneva pinion 192, interrupted gear 200 and the gear wheel 202, it being understood the gear 202 and the dial 188 are mounted on the same stud shaft 204 which is supported by the bridge member 205. The bridge member 205 is mounted on the casing wall 13 by means of screws 206 which pass through suitable spacing sleeves 207. The gear 200 is identical in design to the gear 195 as are also the gears 191 and 202 identical. Thus, for each ten degrees of longitude registered, or counted by the dial 187, the dial 188 is advanced one position to present the next succeeding numeral of the dial 188 at the left window 29 of the dial card of 25. In this manner the pilot or navigator of the aircraft may, at a glance, observe his longitude position by reading the numerals displayed at the windows 29 and noting the position of the pointer 131. The longitude bearing displayed in the showing of Fig. 1 is 74 degrees, 40 minutes west longitude.

The latitude counters comprising the minutes dial 30, the units degrees dial 189 and the tens degrees dial 190 are controlled in exactly the same manner as are the corresponding elements of the longitude counter. More particularly, the rotational movements of the shaft 184 are transmitted to the units dial 189 by the Geneva pinion 208, the interrupted gear 209 and the gear 210. Similarly, the tens degrees dial 190 is advanced under the control of the units degrees dial 189 through the Geneva pinion 211, the interrupted gear 212 and the gear 213. The reading displayed by the latitude indicator as shown in Fig. 1 is 41 degrees, 9 minutes north latitude.

The reset knob 36 has hereinbefore been described as being mounted on the shaft 35 which, at its inner end has fixed thereto a gear 37. The shaft 35 is freely rotatable in the sleeve 34 which is provided at its inner end with an integrally formed link 39. As before described, the sleeve is rotatable independently of the shaft 35 by means of the horizontal lever 38. Through the medium of a connecting pin 220, the link 39 is pivotally associated with a second link 40, the pin 220 passing through an arcuate slot 222 in the casing wall 13 to effect the interconnection of the links 39 and 40. The link 40 has one end pivoted at 225 near the upper apex of a substantially triangularly shaped gear carrier, or suspension device 224. The gear suspension device, or plate 224 is suspended from a stub shaft 226 which passes through a suitable aperture in the casing wall 13 so as to terminate at one end in the gear 227 and at the other end in the gear 228. Through the link mechanism including the link 39 associated with sleeve 34, the connecting pin 220 and the link 40, the gear carrier 224 is adapted to be swung, in pendulum fashion in either direction about its pivot support 226 incident to the tilting operation of the manually operable lever 38. At each of its two lower corners, the suspension device 224 supports a gear such as gears 230 and 231 which are mounted, as illustrated, on stub shafts.

The gears 230 and 231, with the lever 38 in its normal horizontal position, assume the normal positions clearly indicated in Fig. 3, in which they are suspended above the gears 129 and 183, respectively, so as to be out of engagement therewith. When the lever 38, viewing Fig. 1, is tilted clockwise, that is, when the arm designated Long. is depressed, the sleeve 34 is moved clockwise causing the link mechanism, including link 39, pin 220 and link 40, to function so as to cause the plate 224 to pivot about its supporting shaft 226 in such a direction as to move the gear 230 into meshing association with the gear 129. Similarly, when the end of lever 38 marked Lat. is depressed, the plate 224 is swung in the opposite direction to cause the gear 231 to mesh with the gear 183.

While the lever 38 is depressed to either of its operating positions the reset knob 36 may be rotated. Assuming the Long. portion of the lever 38 is depressed and the gears 230 and 129 therefor are in mesh, any rotational movement of the knob 36 will be transmitted to the longitude counter control shaft 127. Under the assumed conditions, the gear 37 fixed to shaft 35 rotates incident to the rotation of knob 36. Gear 37 is normally in mesh with gear 227 which is mounted on the shaft 226 which also carries the gear 228. These gears accordingly, rotate and the last gear 228 drives the gear 240 (also carried by the plate 224), which, in turn, drives the gears 230 and 231. Due to the operation of lever 38 in the manner described, the gear 231 is moved further from the gear 183 whereas the gear 230 is moved into engagement with the gear 129. Gear 129 accordingly rotates the pinion 128 causing the shaft 127 to rotate correspondingly. The friction clutch, such as shown in Fig. 10, which interconnects shaft sections 125 and 127 permits the latter to rotate independent of the former which is held against rotation by the engagement of the escapement pawl with the escapement wheel fixed to the shaft of motor 111. The gear 129 as previously described, controls the setting of the longitude minutes hand 131, being fixed to the shaft 141 which carries the hand 131. Obviously, therefore, any rotational movement of the knob 36, when the lever Long. is depressed, is transmitted to the shaft 141 which controls the longitude counters 187 and 188 through the Geneva pinions 132 and 192 and their associated gears 195 and 200. The longitude counters accordingly may be reset to any reading desired by the pilot or navigator by the operation of knob 36 following the actuation of the lever 38 to its Long. position.

Should the lever 38 be actuated in the opposite direction so as to depress the Lat. section thereof, the gear 231 would be moved into engagement with gear 183 which, as previously described, controls the latitude counters 189 and 190. Obviously, therefore, the latitude indicators may be reset in the same manner as are the longitude indicators.

The wiring schematic shown in Fig. 11 corresponds substantially to that disclosed in Fig. 3 of the aforenoted patent and in order to indicate the similarity, the designation numerals and characters identifying certain elements of Fig. 3 of the said patent are employed to designate the corresponding elements in Fig. 11 of the drawings of the present application. Fig. 11 differs essentially from Fig. 3 of the said patent in that reversible direct current motors 83, 110 and 111 and their corresponding stepping magnets 95, 112 and 113 are employed in place of the stepping units 333, 320 and 300 and their corresponding stepping controls. Also the switches K1 and K2 in the present disclosure are used to control the direction of current supplied to the motors 111 and 110 rather than to control the stepping magnets of the earlier disclosure. The conductors 261, 262, 263, 264, 265, 266, 267, 268, 269, 270, 271, 313, 312, 337, 318, 331 and 335 correspond to similarly identified conductors of the previous disclosure. It will be noted that only two conductors 318 and 331 are required to relay the impulses from the interrupter cams 228 and 238 of the earlier disclosure and that the conductors 317 and 332 thereof are not necessary. Obviously, therefore, the cams 228 and 238 would each control a single interrupter contact, such as 231 and 240, instead of two contacts each, and the two contacts employed would be actuated by their respective cams for each direction of rotation of the said cams to connect ground potential to the conductor 318 and 331.

The stepping motors 83, 110 and 111 will be continuously energized from battery 400 when the control switch 401 is closed. This switch may be conveniently located in the instrument panel and would be actuated just prior to the take-off of the aircraft and after any resetting operations have been performed. The motors are restrained against rotation by virtue of the engagement of their associated escapement, such as 87 in the case of motor 83, with the corresponding escapement wheel, such as 88. Each time the controlling cams 202, 228 and 238 of the aforenoted patent function to connect ground to the conductors 335, 318 and 331 respectively, the corresponding magnets 95, 113 and 112 respond and operate their associated escapements to permit the motors 83, 111 and 110 to advance one step, which, as hereinbefore described, causes the air miles, longitude and latitude counters to be actuated.

The reversing switches K1 and K2 which correspond to the hemisphere reversing switches such as RV1 referred to in an earlier description and which are operated incident to the actuation of the levers 49 and 48, reverse the current leads to the motors 111 and 110 respectively so as to reverse the direction of rotation of these motors as is required depending on whether the flight is being conducted in the northern or southern hemisphere, or east or west of a particular reference meridian. These switches therefore, perform the same ultimate function performed by correspondingly identified switches of Fig. 3 of the drawings of the above-identified patent.

The differential generator DG corresponds identically to the differential generator DG of the previous disclosure as do also the secant potentiometer LTP and the synchro-receiver SRI. It is believed unnecessary to describe the function of these elements in the present application since they are fully covered in the aforenoted copending application.

In order that a complete understanding of the utility and operation of the air position indicator may be had, it will be assumed that the aircraft in which the air position indicator is installed starts a flight from a position 00 degrees, 00 minutes latitude, and 0.15 degree, 20 minutes longitude in the eastern and northern hemispheres.

The pilot, knowing the latitude and longitude of the point of take-off, resets the latitude and longitude counters by the operation of the reset knob 36 and of the lever 38. The lever 38 would be tilted counter-clockwise so that the gear suspension plate 224 (Fig. 3) would swing in a direction, in the manner previously described, such as to cause the engagement of gear 231 with gear 183. The reset knob 36 would then be manually rotated causing the rotation of the shaft 184 to which the latitude minute hand 180 is fixed. The gear train responding to this actuation of the knob 36 includes the gears 37, 227, 228, 240, 231 and 183. The knob 36 is rotated until the minutes, units degrees and tens degrees latitude counters or dials 30, 189 and 190 all display the readings corresponding to 00 degrees, 00 minutes. The lever 38 is then tilted clockwise and the reset knob 36 rotated in a similar manner. Incident to the indicated operation of lever 38, the gear suspension plate 224 would be swung in the opposite direction causing the engagement of gears 230 and 129. The subsequent rotation of the knob 36 will effect the resetting of the longitude counters in a manner now apparent and when the said counters display the reading 0.15 degree, 20 minutes, the lever 38 would be released and, under the action of the restoring springs 41, would resume its normal horizontal position illustrated.

The pilot would also see to it that the keys such as RV1, (K1, K2 of Fig. 10) are in positions indicative of the flight to be made in the northern and eastern hemispheres. This would be accomplished by tilting the lever 49 since the switches are normally set for a flight in the northern and western hemispheres as indicated by the appearance of the letters N and W in the windows 30 of the dial card 25 with the levers 48 and 49 in their normal horizontal positions. The operation of lever 49 would cause the element 57 to rotate clockwise so as to substitute the letter E for the letter W in the right window 30. The corresponding hemisphere selecting switch RV1, for example, would also be actuated through gears 53, 61, 62 and 63, the first of which meshes with the geared section 51 and the last of which controls the shaft 59 which functions to actuate the switch RV1 (K1 of Fig. 10).

It is also assumed that previous to the contemplated flight the airplane has been flown 572 miles as indicated by the reading of the air miles counter shown in Fig. 1. The switch 401 may then be actuated to supply the stepping motors with operating current.

When the flight is started, its true compass course is indicated by the pointer CN. As the flight progresses, and as fully described in the aforenoted patent in connection with the operation of the air miles counter AMC of that application, the stepping magnet 95 receives a pulse once per nautical mile of the flight causing the operation of the stepping motor 83 correspondingly. The motor 83 drives the shaft 82 which is coupled to the control mechanism of the air miles counter 75, in step-by-step fashion. The pilot noting the reading of the counter at any time and by subtracting therefrom the initial reading (572 miles) may ascertain the number of air miles flown.

As the flight continues, the latitude and longitude positions of the aircraft varies and these variations are recorded on the latitude and longitude counters. It is believed unnecessary to describe in detail the manner in which the impulses which control these counters are developed since a complete description thereof is embodied in the above-identified patent. Suffice it to say, that the impulses are transmitted over conductors 318 and 331 to operate stepping magnets 112 and 113 respectively. The magnet 113, for example, in following the impulses received over conductor 331, releases the motor 111 in step-by-step fashion through the associated escapement and toothed wheel, the latter being fixed to the motor shaft. The shaft sections 125 and 127 are driven in a corresponding manner by the motor 111, and through gear pinion 128, drive the gear 129. The gear 129 is fixed to the shaft 141 to which are also fixed the longitude minutes pointer 131 and the Geneva pinion 132 in the manner previously described. Thus, as a consequence of the operation of the stepping magnet 113, in response to the impulses transmitted over conductor 331, the longitude counters comprising the minutes pointer 131 and the dials 187 and 188 are actuated to record the actual longitude bearing of the aircraft at any particular time.

Similarly, the impulses received over conductor 318 function to operate the stepping magnet 112 which, in turn, through its associated escapement and motor toothed wheel steps the motor 110. The motor 110 drives the shaft 181 to which is fixed the pinion 182. The latter drives gear 183 fixed to shaft 184 which corresponds identically to the shaft 141, and to which the latitude minutes pointer 180 is fixed. The shaft 184 also rotates the Geneva pinion 208 which functions to drive the units degrees and tens degrees dials 189 and 190 in the manner hereinbefore described. Thus, as a consequence of the operation of stepping magnet 112, in response to the impulses received over conductor 318, the latitude counters comprising the minutes pointer 180 and the dials 189 and 190 are actuated to record the actual latitude bearing of the aircraft at any particular time.

It will be observed that the shaft 181 which is driven by stepping motor 110 to control the latitude counters in the manner described above, extends rearwardly to control, through the reduction gearing 122, the shaft 186 to which is fixed the secant potentiometer brush 187. The purpose of the secant potentiometer, designated LTP in Fig. 11, is fully explained in the above-identified patent in that portion thereof which discusses the well-known rule of geography that the change in longitude equivalent to a given departure varies in accordance with the secant of the average latitude angle.

In order that the pilot may have an indication of the true course which he is flying, a compass indicator is provided which consists essentially of the dial plate 25 with its outer compass rose and the pointers CN and V. The compass pointer CN is mounted on the shaft 144, clearly shown in Fig. 7, of the rotor of the synchro-receiver 107 (SRI in Fig. 11), the stator windings of which are connected over conductors 267, 268 and 269 with the corresponding stator windings of the secondary transmitting generator STG of Fig. 1A of the drawings of the aforenoted patent. The differential autosyn 120 (DG in Fig. 11) is set by the knob 46 to introduce variation corrections as required as the distance of the aircraft from the magnetic poles increases or decreases. The functioning of this device is fully described in the above-identified patent. It is set manually by the manipulation of the knob 46. As earlier described, the knob 46 is fixed to shaft 45 which, at its inner end, carries the gear 47. This gear meshes with gear 150 which controls the shaft 156. Through the gears 152 and 157 carried by the shaft 156, two similar gear trains are operated, one consisting of gears 153, 154 and 148, and the other of gears 158, 159 and 160. The last gear 148 of the first train, as previously described is fixed to the sleeve 145 which carries the variation pointer V. The last gear 160 of the second train is fixed to the rotor shaft of the differential generator 120 (DG in Fig. 11) so that the setting of the differential generator incident to the manipulation of the knob 46 is accompanied by a corresponding setting of the variation pointer V.

It will be noted that the structural design of the air position indicator of the present invention is such as to simplify its assembly and to facilitate maintenance, as required. To remove the secant potentiometer, it is only necessary to remove the retaining nuts 124 and to then withdraw the potentiometer. The plate 102 may then be slid off the supporting rods 103 thus disengaging the gear reduction 122 from the shaft 181. Similarly, the plate 101, after the removal of the outer sleeves 251, may then be slid off the bars or rods 103 to remove the differential generator 162. The removal of this element disengages gear 160 from gear 159. The unit 100 which mounts the stepping units and gears 159 and 158 may next be slid off the bars 103, after the removal of the intermediate sleeves 251, it being necessary only to remove the gear 157 from the shaft 156 which shaft, as illustrated, extends through both walls or plates 84 and 85 of the unit 100. The synchroreceiver 107 may then next be removed. The last plate 65 together with the rods 103 may then be removed by unscrewing the screws 105 from the bosses 104. Finally, the counter assembly including the casing 12 may, by removing the screws which mount it on the instrument panel, be withdrawn from the front of the panel. Similarly, the dial cover 21 may be separated from the casing by removing suitable retaining screws.

The entire indicator is provided with a suitable cover 404 which is accommodated by the peripheral edges of the various plates 102, 101, 85, 84 and the rim 15 of casting 12. At its outer end, the cover 404 supports a screw coupling element 405 which allows the indicator to be connected with its electrical controls by means of a cable which enters the unit through the connector element 405.

It is to be understood that the indicator disclosed and described is susceptible to variations in design and control without departing from the spirit of the invention. For example, the stepping units for driving the counters may be replaced by alternating or direct current motors of the type known commonly as a Selsyn, or by motors of the type used in remotely operated compasses for marine use.

What is claimed is:

1. In an air position indicating instrument, a housing, a cover for said housing, a pair of counters supported within said housing and each including a shaft to which a gear is fixed, and means for selecting either of said counter gears for manual operation, comprising a separate gear for each of said counter gears normally disengaged therefrom, a bushing located in said housing cover, a lever located exteriorly to said cover, a sleeve housed in said bushing supporting said lever, a suspension device carrying said separate gears, and a link mechanism interposed between said sleeve and said suspension device and operable incident to the actuation of said lever in either of two directions for moving said suspension device in a direction such as to cause one of the gears carried thereby to mesh with the selected counter gear corresponding to the direction in which said lever is actuated, and means for actuating the selected counter gear comprising a knob-ended shaft housed for rotation within and independently of said sleeve, and a gear train interposed between said shaft and the selected counter gear.

2. The combination in an air position indicating instrument of a casting, a pair of counters mounted thereon, each of said counters having a separate gear through which motion is transmitted thereto, and means for selectively operating said separate gears comprising a suspension device, a gear for each of said counter gears carried by said suspension device in normal disengaged relation thereto, means for pivotally supporting said suspension device comprising a shaft carried by said casting and terminating at each end in a gear, means for selectively moving said suspension device in either direction about its pivot so as to selectively engage one of the gears carried thereby with a corresponding counter gear comprising a sleeve projecting forwardly from said instrument, a link mechanism interposed between said sleeve and said suspension device and a lever fixed to said sleeve and manually rotatable in either direction, and means for rotating the selectively engaged counter gear comprising a shaft located within and rotatable independently of said sleeve, a gear train comprising a gear fixed to one end of said last-mentioned shaft, the two gears in which said first shaft terminates and the selectively engaged counter and suspension device gears, and a manually operable knob fixed to said last-mentioned shaft.

3. In an air position indicating instrument, a substantially cylindrical casting having a partition dividing the casting into two compartments, a dial card constituting a closure for one of said compartments and having a plurality of windows therein, a pair of counters supported by said partition so as to occupy the compartment enclosed by said dial card and having numeral indicating discs located so as to display the numerals thereof in said dial card windows, a gear for each of said counters located in the other of said compartments and adapted to advance said counters so that the discs thereof display different numerals in said dial card windows as said counters are operated through their respective gears, a cover for clamping said dial card in position on said casting, and means for manually operating said counters comprising a gear suspension device mounting a gear for each of said counter gears in normal disengaged relation therewith, a shaft projecting through said partition and carrying on each end thereof a gear and pivotally supporting near its inner end said gear suspension device, a second shaft projecting through said partition and carrying at its inner end a link pivotally associated with said suspension device, a second link carried on the outer end of said second shaft and connected to said first link, and means for operating said link mechanism so as to pivot said suspension device about its support to selectively move one or the other of the gears carried by said suspension device into engagement with its corresponding counter gear comprising a sleeve fixed to said second link and projecting through said cover to terminate in a manually operable lever, and means for rotating the selectively engaged counter gear comprising a shaft rotatable within said sleeve and independently thereof, a knob fixed to the outer end of said shaft, and a gear train including the gears fixed to said first-mentioned shaft, the selectively engaged gears of said counters and of said suspension device, and a gear carried by said last-mentioned shaft normally in mesh with one of the gears carried by said first-mentioned shaft.

4. An air position indicating instrument comprising, in combination, a substantially cylindrical housing adapted to fit a correspondingly shaped aperture in the instrument panel of an airplane, a partition therefore dividing said housing into forward and rear annular compartments, indicators mounted on the front side of said partition so as to occupy the said front compartment of said housing, gear units carried on the inner side of said partition so as to occupy the said rear compartment of said housing for operating said indicators, a frame comprising an end plate removably fixed on and in spaced relation to the inner side of said partition and contoured to be snugly fit within the annular wall of said rear compartment and a plurality of rods projecting rearwardly at right angles thereto, a plurality of individually removable apparatus units slidably mounted in tandem on said rods, each of said units including control elements, and means coupling the control elements of said apparatus units with said gearing units whereby said indicators are operated, through said gearing units, under the control of said control elements.

5. An air position indicating instrument as described in the preceding claim and in which each of the said apparatus units includes one or more mounting plates having the same peripheral contour and over-all dimension as the annular wall of the said rear compartment of said housing and which are mounted in spaced alignment with the said annular wall, and in which a cylindrical sheath is supported on the peripheries of said plates and said annular wall to effect a cover for said frame.

6. An air position indicator comprising a substantially cylindrical housing element adapted to fit a correspondingly shaped aperture in the instrument panel of an airplane, a partition dividing said housing element into forward and rear annular compartments, latitude and longitude counters supported by said partition so as to occupy the said front compartment, a frame removably mounted on said partition and extending rearwardly therefrom, said frame supporting a plurality of tandem mounted apparatus assemblies, a stepping unit for each of said latitude and longitude indicators in one of said assemblies comprising a normally energized reversible motor, a shaft rotatable thereby, an escapement wheel fixed to said shaft, an escapement pawl cooperating with said wheel so as to normally restrain the corresponding motor against rotation, and an electromagnet for actuating the escapement pawl to free the corresponding motor for step-by-step operation, gearing for connecting the shafts of said motors each to a different one of said counters, a pair of shaft controlled switches in another of said tandem mounted assemblies, each of said switches adapted to render a corresponding motor operable in either direction incident to the energization of its corresponding electromagnet and manually operable means for actuating said switches comprising a single shaft projecting forwardly from the said forward compartment of said housing, a pair of relatively rotatable coaxial sleeves telescopically mounted on said shaft, means coupling the inner ends of said sleeves with the shafts of their corresponding switches, and a lever formed integral with the outer end of each of said sleeves.

WILLIAM H. T. HOLDEN.

REFERENCES CITED

The following references are of record in the file of this patent:

UNITED STATES PATENTS

| Number | Name | Date |
|---|---|---|
| 1,049,220 | Frank | Dec. 31, 1912 |
| 1,403,182 | Maturin | Jan. 10, 1922 |
| 1,512,144 | Smithey | Oct. 21, 1924 |
| 1,544,860 | Reisbach | July 7, 1925 |
| 1,549,050 | Rudin | Aug. 11, 1925 |
| 1,660,641 | Banning, Jr. | Feb. 28, 1928 |
| 1,784,773 | Zubaty | Dec. 9, 1930 |
| 1,790,864 | Holtz | Feb. 3, 1931 |
| 2,081,827 | Lohe | May 25, 1937 |
| 2,172,061 | Ford | Sept. 5, 1939 |
| 2,228,462 | Kienzle | Jan. 14, 1941 |
| 2,265,628 | Chase | Dec. 9, 1941 |
| 2,293,752 | O'Brien | Apr. 25, 1942 |
| 2,294,165 | Elms | Aug. 25, 1942 |
| 2,365,130 | Zulficar | Dec. 12, 1944 |